G. H. FISHER.
APPARATUS FOR PRODUCING CRYSTAL ICE FROM RAW WATER.
APPLICATION FILED JAN. 29, 1914.

1,113,111.

Patented Oct. 6, 1914.
2 SHEETS—SHEET 1.

WITNESSES:
R. Hamilton
L. J. Fischer

INVENTOR:
George H. Fisher,
BY
F. G. Fischer
ATTORNEY.

THE NORRIS PETERS CO., PHOTO-LITHO., WASHINGTON, D. C.

G. H. FISHER.
APPARATUS FOR PRODUCING CRYSTAL ICE FROM RAW WATER.
APPLICATION FILED JAN. 29, 1914.
1,113,111.
Patented Oct. 6, 1914.
2 SHEETS—SHEET 2.
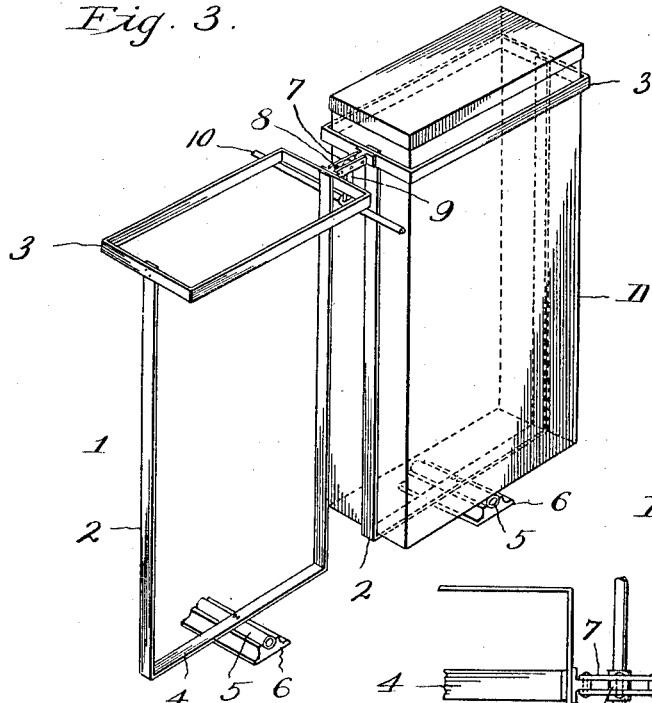
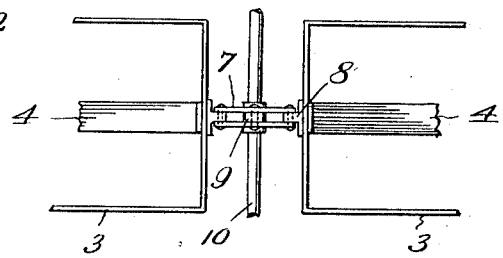
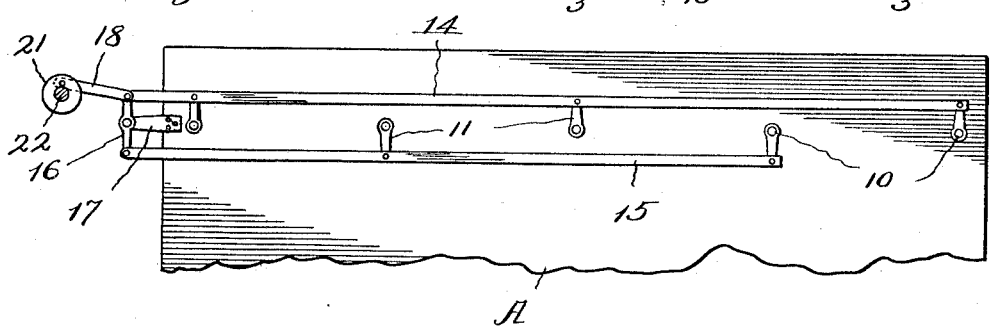
WITNESSES:
R. E. Hamilton
L. J. Fischer
INVENTOR:
George H. Fisher,
BY
F. G. Fischer,
ATTORNEY.

UNITED STATES PATENT OFFICE.

GEORGE H. FISHER, OF LEAVENWORTH, KANSAS.

APPARATUS FOR PRODUCING CRYSTAL ICE FROM RAW WATER.

1,113,111.    Specification of Letters Patent.    Patented Oct. 6, 1914.

Application filed January 29, 1914. Serial No. 815,178.

*To all whom it may concern:*

Be it known that I, GEORGE H. FISHER, a citizen of the United States, residing at Leavenworth, in the county of Leavenworth and State of Kansas, have invented certain new and useful Improvements in Apparatus for Producing Crystal Ice from Raw Water, of which the following is a specification.

This invention relates to the production of artificial ice from raw water, or, in other words, water which has not been distilled, and my object is to provide means whereby the raw water may be congealed in the form of crystal ice, free from impurities.

I have discovered by personally conducted tests that the foregoing object can be successfully attained by agitating the raw water, and agitating and circulating the brine for freezing said raw water during the freezing process, and the present invention relates more particularly to the means employed for agitating and circulating the brine and for agitating said raw water.

The invention is simple in construction and operation, and can be readily applied to ice-making plants employing distilling apparatus and congealing cans without discarding any part of said plants, it being necessary only to discontinue the use of the distilling apparatus when making ice from raw water. No particular size or design of congealing-cans, brine-tanks, or other appliances than those now in general use are required in the application of the invention to standard plants of the present time.

Figure 1:
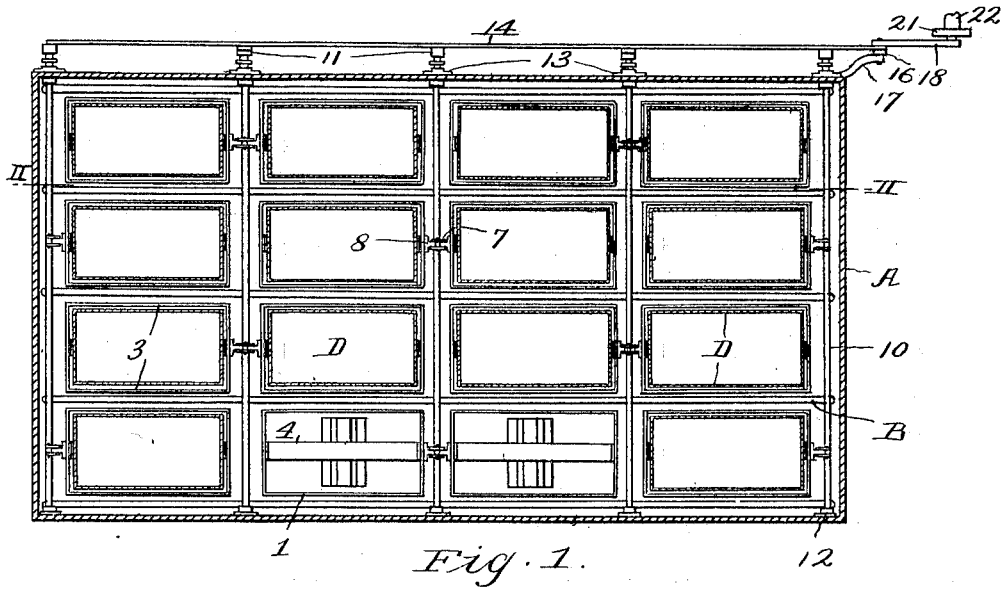
Figure 2:
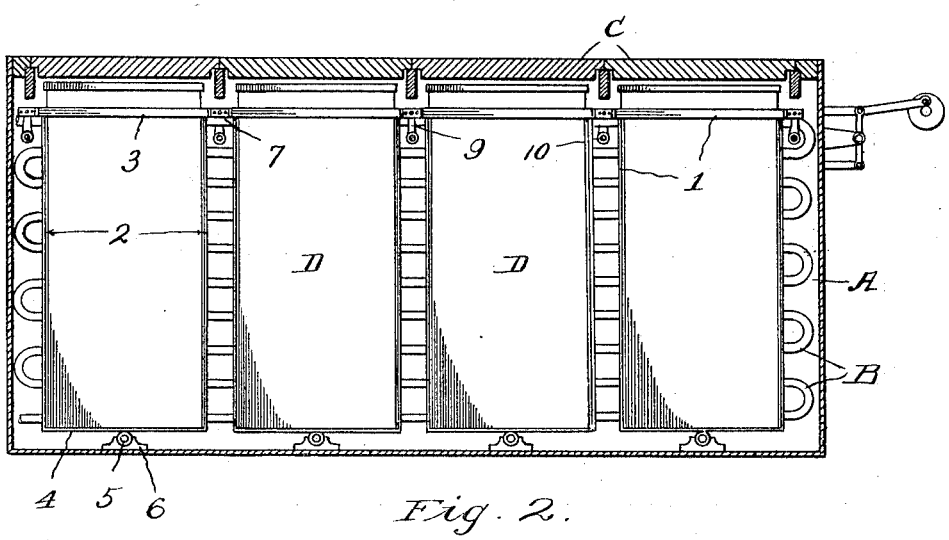

In order that the invention may be fully understood, reference will now be made to the accompanying drawings, in which:

Figure 1 is a sectional plan view of an ordinary brine-tank provided with my improvements. Fig. 2 is a vertical longitudinal section on line II—II of Fig. 1. Fig. 3 is a detail perspective of a congealing-can and two congealing-can holders, the latter forming important features of the present invention. Fig. 4 is a detail side elevation of the brine-tank turned in a reverse direction to that disclosed by Fig. 2. Fig. 5 is a broken plan view of a pair of congealing-can holders.

A designates a brine-tank of usual construction for the purpose of making artificial ice according to the tank or block system.

B designates congealing coils submerged in the brine-tank A, which latter has covers C to normally close the openings through which the congealing-cans D are let into and removed from the tank A. The congealing-cans D are of ordinary construction.

1 designates a plurality of holders for the congealing-cans D, one holder being provided for each can. Each holder is of skeleton form and in the present instance comprises a U-shaped stand 2 and a rectangular band 3 secured to the upper terminals of the stand 2. The holder 1 is of such size as to readily receive a congealing-can, which when placed therein rests upon the transverse lower portion 4 of the stand 2, and is held from lateral movement in either direction by the band 3. Holder 1 is fixedly-mounted at its lower central portion upon a rock-shaft 5, which in turn is mounted on a step-bearing 6 secured to the bottom of the brine-tank A. All of the holders 1, except each alternate end holder, are connected in pairs by links 7, (Fig. 1) pivotally-secured at their ends to lugs 8 projecting from the sides of the bands 3. Links 7 are arranged in pairs spaced apart to receive rocker-arms 9, fixed to rock-shafts 10 extending transversely through the brine-tank A. One end of each shaft projects through one side of the brine-tank and has fixedly-mounted thereon a crank 11. Bearings 12 are provided at one side of the brine-tank A for the inner ends of the rock-shafts 10, and stuffing-boxes 13 are provided at the opposite side of the brine-tank to support said rock-shafts 10 and prevent leakage of brine from said brine-tank at the points where the rock-shafts extend therethrough. The cranks 11 alternately extend upward and downward, those extending upward being operably-united by a connecting-bar 14 and those extending downward being operably-united by a connecting-bar 15.

The connecting-bars 14—15 are pivoted to the opposite ends of a lever 16, fulcrumed at its central portion upon a bracket 17 projecting from the adjacent portion of the brine-tank A. The upper end of lever 16 is pivotally-connected to one end of a pitman 18, the opposite end of which is pivotally-connected to a disk 21 fixed upon a shaft 22, which may be driven by any suitable means.

As shown by the sectional plan view Fig. 1, each alternate pair of holders is actuated by one rock-shaft 10, while the others are actuated by another rock shaft 10, and as said shafts are rocked in alternate directions to each other by the oppositely-extending cranks 11, greater agitation and circulation of the brine in the tank A is obtained in consequence of the opposite directions in which the congealing-cans D move, hence the pumps usually employed to circulate the brine in the tank A may be dispensed with. The rocking of the congealing-cans D results in the production of transparent or crystal ice, and also in reducing the water therein to a frozen state more rapidly than if it were permitted to freeze while in a quiescent state. Thus a superior quality of ice is economically produced.

After the raw water in the congealing-cans D is frozen to the desired density the covers C are removed and said congealing-cans are hoisted from their respective holders 1, which are permitted to remain in the brine-tank A.

While I have shown and described the preferred form of my invention, it is of course understood that I do not restrict myself to the precise construction, combination, and arrangement of the parts disclosed, but reserve the right to make such changes as properly fall within the spirit and scope of the claims.

Having thus described my invention, what I claim and desire to secure by Letters Patent is:

1. In an apparatus of the character described, a congealing-can holder consisting of a U-shaped stand, and a skeleton band secured to the upper terminals of said stand; and means for actuating said holder.

2. In an apparatus of the character described, a congealing-can holder, a rock-shaft upon which said holder is mounted, a step-bearing on which said rock-shaft is mounted, and means for rocking said holder.

3. In an apparatus of the character described, a brine tank, congealing-cans therein, holders for said cans, rocker arms to actuate said holders, shafts carrying said rocker-arms, cranks mounted upon said shafts, said cranks extending in opposite directions, connecting-bars operably-uniting the cranks, a lever to move said connecting-bars in opposite directions to each other, and means for actuating said lever.

In testimony whereof I affix my signature, in the presence of two witnesses.

GEORGE H. FISHER.

Witnesses:
FRED C. FISCHER,
R. E. HAMILTON.

---

Copies of this patent may be obtained for five cents each, by addressing the "Commissioner of Patents, Washington, D. C."